United States Patent
Sasaki et al.

(10) Patent No.: US 9,051,992 B2
(45) Date of Patent: Jun. 9, 2015

(54) SILENT CHAIN

(71) Applicant: TSUBAKIMOTO CHAIN CO., Osaka-shi, Osaka (JP)

(72) Inventors: Takeo Sasaki, Osaka (JP); Takashi Tohara, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 129 days.

(21) Appl. No.: 13/947,364

(22) Filed: Jul. 22, 2013

(65) Prior Publication Data

US 2014/0045632 A1    Feb. 13, 2014

(30) Foreign Application Priority Data

Aug. 8, 2012  (JP) .................. 2012-176349

(51) Int. Cl.
*F16G 13/04* (2006.01)
*F16G 13/08* (2006.01)

(52) U.S. Cl.
CPC ................. *F16G 13/04* (2013.01); *F16G 13/08* (2013.01)

(58) Field of Classification Search
CPC ........... F16G 13/04; F16G 5/18; F16G 13/06; B21L 15/005; F16H 9/24
USPC ................................................ 474/212, 215
See application file for complete search history.

(56) References Cited

U.S. PATENT DOCUMENTS

| | | | | |
|---|---|---|---|---|
| 757,762 A * | 4/1904 | Morse | ............... | 474/216 |
| 989,719 A * | 4/1911 | Morse | ............... | 474/215 |
| 1,561,676 A * | 11/1925 | Wertman | ............... | 474/215 |
| 1,563,065 A * | 11/1925 | Belcher | ............... | 474/215 |
| 1,678,315 A * | 7/1928 | Belcher | ............... | 474/215 |
| 1,692,799 A * | 11/1928 | Sturtevant | ............... | 474/215 |
| 2,067,243 A * | 1/1937 | Perry | ............... | 474/215 |
| 3,213,699 A * | 10/1965 | Terepin | ............... | 474/215 |
| 4,010,656 A * | 3/1977 | Jeffrey | ............... | 474/215 |
| 4,130,026 A * | 12/1978 | Jeffrey | ............... | 474/215 |
| 4,764,158 A * | 8/1988 | Honda et al. | ............... | 474/212 |
| 4,904,231 A * | 2/1990 | Zimmer | ............... | 474/214 |
| 4,911,682 A * | 3/1990 | Ivey et al. | ............... | 474/245 |
| 5,345,753 A * | 9/1994 | Okuda et al. | ............... | 59/5 |
| 5,372,554 A * | 12/1994 | Okuda | ............... | 474/206 |
| 6,406,394 B1 * | 6/2002 | Bubel et al. | ............... | 474/212 |
| 6,572,503 B2 * | 6/2003 | Horie et al. | ............... | 474/213 |
| 6,579,200 B2 * | 6/2003 | Wakabayashi | ............... | 474/214 |

(Continued)

FOREIGN PATENT DOCUMENTS

JP    07-010586 U    2/1995
JP    2000-320619 A    11/2000

*Primary Examiner* — Henry Liu
(74) *Attorney, Agent, or Firm* — Westerman, Hattori, Daniels & Adrian, LLP

(57) ABSTRACT

There is provided a silent chain that is reduced in weight and widthwise size by reducing the length of a short pin while preventing the occurrence of excessive stress concentration in the short pin of a rocker pin including a long pin and the short pin. The short pin of the rocker pin extends through all plates of the guide row and all plates of the non-guide row in the width direction. The short pin is provided with a first stopper, and a second stopper. A first end surface of the short pin is prevented from being positioned in a first adjacent pin hole by contact between the first stopper and the first contact portion, and a second end surface of the short pin is prevented from being positioned in a second adjacent pin hole by contact between the second stopper and the second contact portion.

4 Claims, 9 Drawing Sheets

(56) References Cited

U.S. PATENT DOCUMENTS

| | | | |
|---|---|---|---|
| 6,589,127 B1* | 7/2003 | Horie et al. | 474/215 |
| 2003/0236145 A1* | 12/2003 | Ledvina et al. | 474/215 |
| 2007/0087883 A1* | 4/2007 | Tada et al. | 474/215 |
| 2007/0129195 A1* | 6/2007 | Kuster et al. | 474/245 |
| 2007/0142150 A1* | 6/2007 | Vietoris | 474/212 |
| 2007/0238566 A1* | 10/2007 | Miura | 474/245 |
| 2008/0015070 A1* | 1/2008 | Miura | 474/155 |
| 2010/0216580 A1* | 8/2010 | Kabai et al. | 474/207 |
| 2011/0065542 A1* | 3/2011 | Adachi et al. | 474/215 |

* cited by examiner

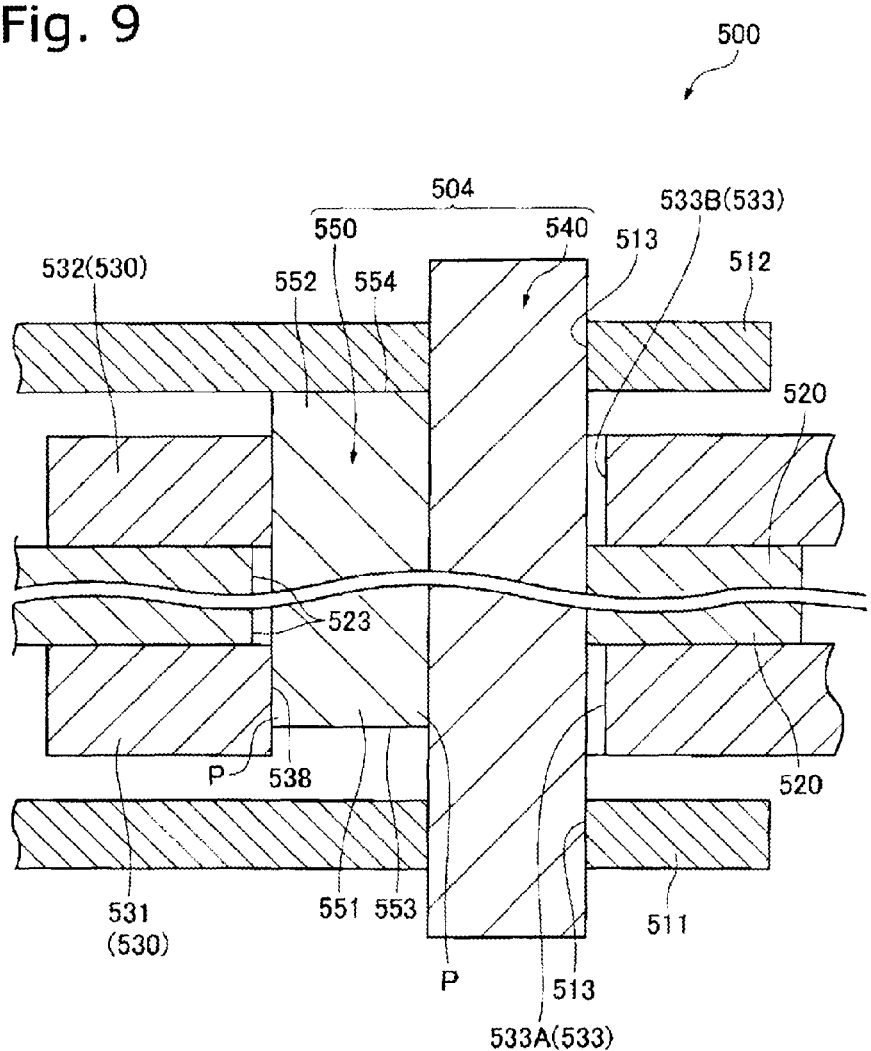

SILENT CHAIN

BACKGROUND OF THE INVENTION

1. Field of the Invention

The present invention relates to a silent chain in which a guide row and a non-guide row adjacent to each other in a longitudinal direction are coupled so as to be bendable by a rocker pin including a long pin and a short pin.

The silent chain is provided in a chain drive system, and the chain drive system is used in, e.g., power equipment for an automobile.

2. Description of the Related Art

Conventionally, in a silent chain having a rocker pin that couples a guide row and a non-guide row such that the guide row and the non-guide row are bendable, the rocker pin includes a long pin and a short pin.

Referring to FIG. 9, in a silent chain 500, a long pin 540 of a rocker pin 504 is held in guide pin holes 513 of a pair of guide plates 511 and 512 so as not to slip out therefrom, and is inserted into first pin holes 523 of a plurality of first plates 520 and second pin holes 533 of a plurality of second plates 530. A short pin 550 of the rocker pin 504 is inserted into the first pin holes 523 and the second pin holes 533.

Incidentally, to the silent chain 500 after its assemble, for the purpose of removing assembly distortion, a proof load as a tensile load set to be larger than tension occurring during travel of the silent chain 500 is normally applied in a longitudinal direction of the chain. In the silent chain 500 in which the tension is generated by the application of the proof load, there are cases where end surfaces 553 and 554 of end portions 551 and 552 of the short pin 550 that is movable in a width direction of the chain relative to the first and second plates 520 and 530 are positioned in adjacent pin holes 533A and 533B as the second pin holes 533 of adjacent plates 531 and 532 as the second plates 530 adjacent to the guide plates 511 and 512.

For example, as shown in FIG. 9, in a case where the end surface 553 is positioned in the adjacent pin hole 533A, due to the small width of a contact area between the short pin 550, the long pin 540, and a wall surface 538 of the adjacent pin hole 533A in the width direction of the chain, a contact pressure between the end portion 551 having the end surface 553, the long pin 540, and the wall surface 538 becomes extremely large in the adjacent pin hole 533A, and excessive stress concentration occurs in a portion P in the vicinity of the end surface 553 in the end portion 551 due to the contact pressure. At this point, due to the excessive stress concentration occurring in the end portion 551, there are cases where a crack that causes a reduction in the strength of the silent chain 500 occurs in the short pin 550.

In addition, there are cases where the similar stress concentration occurs also in the traveling silent chain 500 when the tension thereof is increased.

To cope with this, there is known a technology for implementing a state where the short pin always extends through the adjacent plates in order to increase the width of the contact area between the short pin, the long pin, and the wall surfaces of the pin holes in the width direction of the chain in the pin holes of the adjacent plates adjacent to the pair of guide plates in the width direction of the chain (see, e.g., Japanese Patent Application Publication No. 2000-320619 (paragraphs 0047 to 0059, FIGS. 4 to 13), and Japanese Utility Model Application Publication No. H7-10586 (claims of utility model, FIGS. 1 and 2)).

Incidentally, when consideration is given to the relative movement of the first plate of the guide row, the second plate of the non-guide row, and the short pin in the width direction of the chain, in order to reliably maintain the state where the short pin always extends through the adjacent plates, the length of the short pin tends to be increased. As a result, there have been a problem that the weight of the silent chain is increased and a problem that the size of the silent chain is increased in the width direction of the chain.

SUMMARY OF THE INVENTION

The present invention has been achieved in order to solve the above problems, and an object of the present invention is to provide the silent chain that is reduced in weight and widthwise size by reducing the length of the short pin while preventing the occurrence of the excessive stress concentration in the short pin of the rocker pin including the long pin and the short pin.

Another object of the present invention is to provide the silent chain that prevents damage to a stopper provided in the short pin while implementing a reduction in widthwise size.

According to an exemplary aspect of the present invention, there is provided a silent chain comprising: a plurality of guide rows; a plurality of non-guide rows; and a plurality of rocker pins that couple each of the guide rows and each of the non-guide rows adjacent to each other in a longitudinal direction such that the guide row and the non-guide row are bendable, the guide row being formed of a pair of guide plates and one or more first plates disposed between the pair of guide plates in a width direction, the non-guide row being formed of a plurality of second plates disposed between the pair of guide plates in the width direction, each of the plurality of rocker pins being formed of a long pin that is inserted into a guide pin hole of each of the guide plates, a first pin hole of each of the first plates, and a second pin hole of each of the second plates, and a short pin that is inserted into the first pin hole and the second pin hole and is shorter than the long pin, the long pin and the short pin extending through all of the first plates of each guide row and all of the second plates of each non-guide row in the width direction, first and second adjacent plates as a pair of the second plates adjacent to first and second guide plates as the pair of guide plates in the width direction being provided with first and second contact portions respectively, the short pin being provided with a first stopper capable of coming into contact with the first contact portion toward a first direction in the width direction, and a second stopper capable of coming into contact with the second contact portion toward a second direction opposite to the first direction, a first end surface of the short pin being prevented from being positioned in the second pin hole of the first adjacent plate by contact between the first stopper and the first contact portion, and a second end surface of the short pin being prevented from being positioned in the second pin hole of the second adjacent plate by contact between the second stopper and the second contact portion.

A length of the short pin may be shorter than a widthwise space between the first guide plate and the second guide plate, and a widthwise space between the first stopper and the second stopper of the short pin may be set to be larger than the sum of thicknesses of the first plate and the second plate through which the short pin extends.

The first guide plate may be provided with a first concave portion capable of accommodating the entire first end surface of the short pin including the first stopper, and the second guide plate may be provided with a second concave portion capable of accommodating the entire second end surface of the short pin including the second stopper.

In the present invention, the longitudinal direction corresponds to the longitudinal direction of the chain, the width direction corresponds to the width direction of the chain, and the height direction corresponds to the height direction of the chain. In addition, the height direction corresponds to a direction orthogonal to the longitudinal direction and the width direction with respect to the silent chain in its straightened state.

The silent chain of the present invention includes the plurality of guide rows, the plurality of non-guide rows, and the plurality of rocker pins that couple each of the guide rows and each of the non-guide rows adjacent to each other in the longitudinal direction such that the guide row and the non-guide row are bendable, the guide row includes the pair of guide plates and one or more first plates disposed between the pair of guide plates in the width direction, the non-guide row includes the plurality of second plates disposed between the pair of guide plates in the width direction, each of the plurality of rocker pins includes the long pin that is inserted into the guide pin hole of each of the guide plates, the first pin hole of each of the first plates, and the second pin hole of each of the second plates, and the short pin that is inserted into the first pin hole and the second pin hole and is shorter than the long pin, and the long pin and the short pin extend through all of the first plates of each guide row and all of the second plates of each non-guide row in the width direction, whereby the short pin of each rocker pin supports the first and second adjacent plates as the pair of the second plates adjacent to the pair of the guide plates in the width direction in each non-guide row in a state where the short pin extends through the second pin holes thereof. As a result, it is possible to prevent the occurrence of excessive stress concentration in each of the first and second end portions of the short pin when tension occurs in the silent chain, and hence it is possible to improve the durability of the short pin and increase a proof load applied to the silent chain after its assembly to increase a residual compressive stress in each of the first and second plates so that it is possible not only to reduce the elastic elongation of the silent chain to improve the effect of preventing jumping but also to achieve the following effects specific to the present invention.

That is, according to the silent chain of the first aspect of the present invention, the first and second adjacent plates as the pair of the second plates adjacent to the first and second guide plates as the pair of guide plates in the width direction are provided with the first and second contact portions respectively, the short pin is provided with the first stopper capable of coming into contact with the first contact portion toward the first direction in the width direction, and the second stopper capable of coming into contact with the second contact portion toward the second direction opposite to the first direction, the first end surface of the short pin is prevented from being positioned in the second pin hole of the first adjacent plate by the contact between the first stopper and the first contact portion, and the second end surface of the short pin is prevented from being positioned in the second pin hole of the second adjacent plate by the contact between the second stopper and the second contact portion, whereby, for example, the short pin can be set so as to always extend through the second pin holes of the first and second adjacent plates such that the first and second end surfaces of the short pin are not positioned in the second pin holes of the first and second adjacent plates by bringing the first and second stoppers of the short pin into contact with the first and second contact portions of the first and second adjacent plates irrespective of the length of the short pin itself. As a result, the length of the short pin can be reduced within a range that allows the provision of the first and second stoppers, and hence the silent chain can be reduced in weight and widthwise size by reducing the length of the short pin.

According to the configuration of the second aspect, the length of the short pin is shorter than the widthwise space between the first guide plate and the second guide plate, and the widthwise space between the first stopper and the second stopper of the short pin is set to be larger than the sum of thicknesses of the first plate and the second plate through which the short pin extends, whereby, when the second end surface including the second stopper is in contact with the second guide plate (a first contact state) or when the first end surface including the first stopper is in contact with the first guide plate (a second contact state), a widthwise gap is formed between the short pin and the first guide plate or between the short pin and the second guide plate, the short pin is reduced in widthwise length correspondingly to the formation of the widthwise gap, and the short pin is reduced in weight by the reduction in the widthwise length of the short pin, and hence the silent chain can be reduced in widthwise size and weight.

In addition, since the widthwise gap is formed in the first contact state and the second contact state, the contact between the first guide plate and the first adjacent plate and the contact between the second guide plate and the second adjacent plate are suppressed by the first and second stoppers so that it is possible to reduce the wear and the frictional resistance caused by the contacts in each of the first and second guide plates and the first and second adjacent plates.

Further, the movement amount of the short pin in the width direction is restricted by the first and second end surfaces including the first and second stopper capable of coming into contact with the first and second guide plates, and hence, even in a case where the first adjacent plate (the second adjacent plate) moves in the second direction (the first direction) to come into contact with the first stopper (the second stopper) when the first end surface including the first stopper is in contact with the first guide plate (or when the second end surface including the second stopper is in contact with the second guide plate), the first end surface including the first stopper (the second end surface including the second stopper) is supported by the first guide stopper (the second guide stopper) in contact therewith so that it is possible to prevent damage (e.g., bending) to the first stopper (the second stopper) without enhancing the rigidity of the first stopper (the second stopper). In addition, it is not necessary to enhance the rigidity of each of the first and second stoppers so that the short pin can be reduced in weight correspondingly.

According to the configurations of the third aspect and the fourth aspect, the first guide plate is provided with the first concave portion capable of accommodating the entire first end surface of the short pin including the first stopper, and the second guide plate is provided with the second concave portion capable of accommodating the entire second end surface of the short pin including the second stopper, whereby, since the first and second stoppers are accommodated in the first and second concave portions, the silent chain is reduced in widthwise size. In the state where the first and second stoppers are accommodated in the first and second concave portions, the end surfaces of the short pin are positioned inside the first and second guide plates, and hence it is possible to reduce a shear force generated in the long pin by the short pin biased by tension occurring in the chain to improve the durability of the long pin.

Further, since the entire end surface including each stopper is accommodated in the concave portion, the silent chain can be further reduced in widthwise size. Furthermore, when the entire first end surface including the first stopper is positioned in the first concave portion (or when the entire second end surface including the second stopper is positioned in the second concave portion), even in a case where the first adjacent plate (the second adjacent plate) moves in the second direction (the first direction) with respect to the short pin, the contact between the first adjacent plate (the second adjacent plate) and the first stopper (the second stopper) is avoided by the contact between the first adjacent plate (the second adjacent plate) and the first guide plate (the second guide plate), and hence it is possible to prevent damage to the first and second stoppers without enhancing the rigidity of each of the first and second stoppers.

BRIEF DESCRIPTION OF THE DRAWINGS

FIG. 9 shows a silent chain of a conventional art, and is a view corresponding to FIG. 3

DESCRIPTION OF THE PREFERRED EMBODIMENTS

The specific configuration of a silent chain according to the present invention may be any configuration as long as the silent chain includes a plurality of guide rows, a plurality of non-guide rows, and a plurality of rocker pins that couple each of the guide rows and each of the non-guide rows adjacent to each other in a longitudinal direction such that the guide row and the non-guide row are bendable, the guide row includes a pair of guide plates and one or more first plates disposed between the pair of guide plates in a width direction, the non-guide row includes a plurality of second plates disposed between the pair of guide plates in the width direction, each of the plurality of rocker pins includes a long pin that is inserted into a guide pin hole of each of the guide plates, a first pin hole of each of the first plates, and a second pin hole of each of the second plates, and a short pin that is inserted into the first pin hole and the second pin hole and is shorter than the long pin, the long pin and the short pin extend through all of the first plates of each guide row and all of the second plates of each non-guide row in the width direction, first and second adjacent plates as a pair of the second plates adjacent to first and second guide plates as the pair of guide plates in the width direction are provided with first and second contact portions respectively, the short pin is provided with a first stopper capable of coming into contact with the first contact portion toward a first direction in the width direction, and a second stopper capable of coming into contact with the second contact portion toward a second direction opposite to the first direction, a first end surface of the short pin is prevented from being positioned in the second pin hole of the first adjacent plate by contact between the first stopper and the first contact portion, and a second end surface of the short pin is prevented from being positioned in the second pin hole of the second adjacent plate by contact between the second stopper and the second contact portion, whereby the silent chain is reduced in weight and widthwise size by reducing the length of the short pin while preventing the occurrence of excessive stress concentration in the short pin of the rocker pin including the long pin and the short pin.

Examples of equipment in which a chain drive system provided with the silent chain of the present invention is used include power equipment for an automobile (i.e., equipment provided with an engine and a power transmission device), industrial equipment, or conveying equipment. The engine is an internal combustion engine or equipment other than the internal combustion engine (e.g., an electric motor).

Embodiments

Hereinbelow, embodiments of the present invention will be described with reference to FIGS. 1 to 8.

Figure 1:
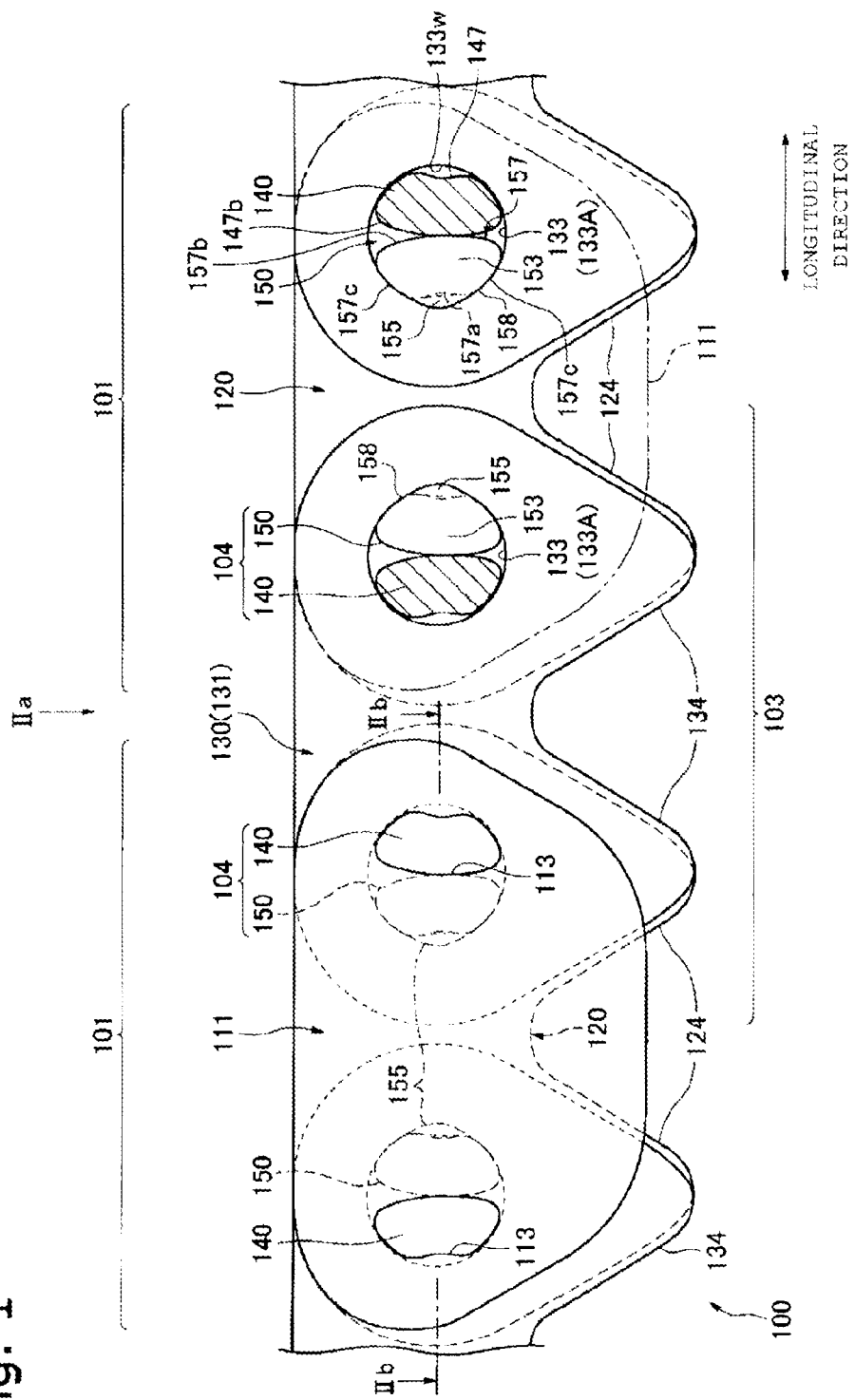
FIG. 1 shows a first embodiment of the present invention, and is a side view of a principal portion of a silent chain and partly a cross-sectional view taken along line I-I of FIG. 2.
Figure 2:
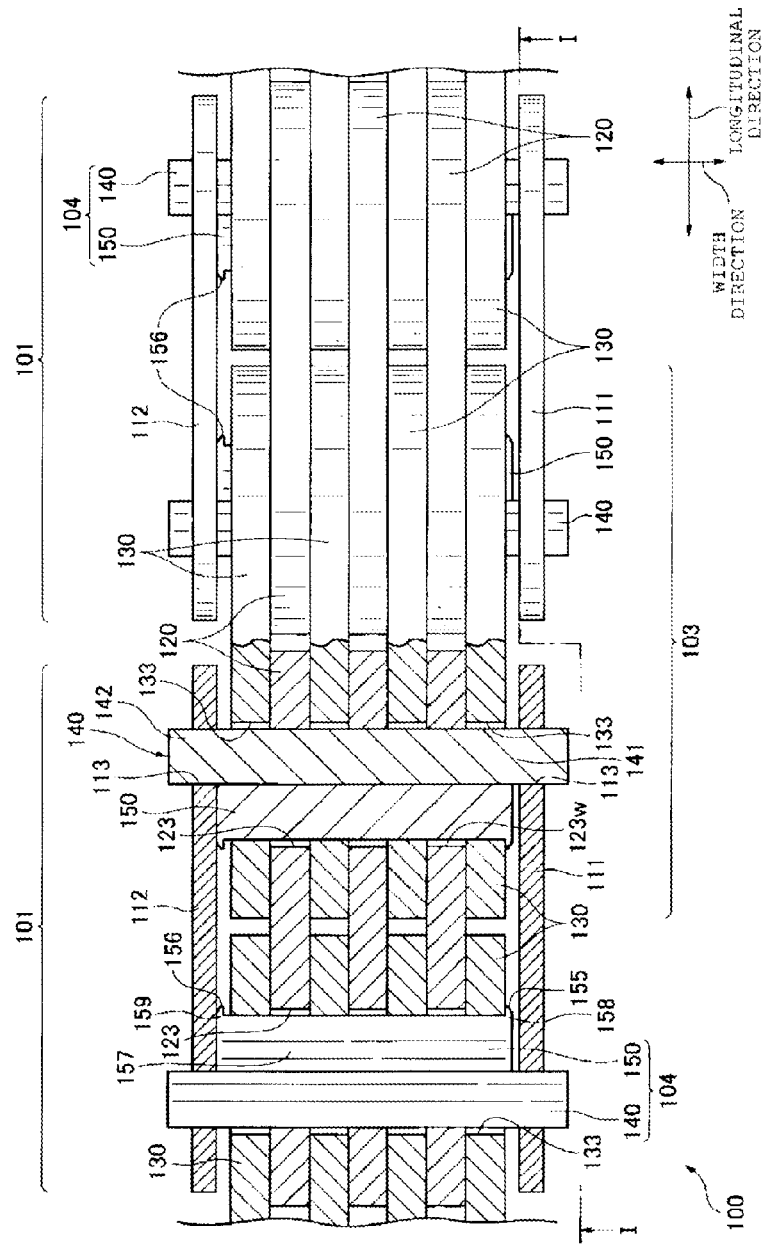
FIG. 2 is a view as seen in the direction of arrow IIa of FIG. 1 and partly a cross-sectional view taken along line IIb-IIb of FIG. 1.
Figure 3:
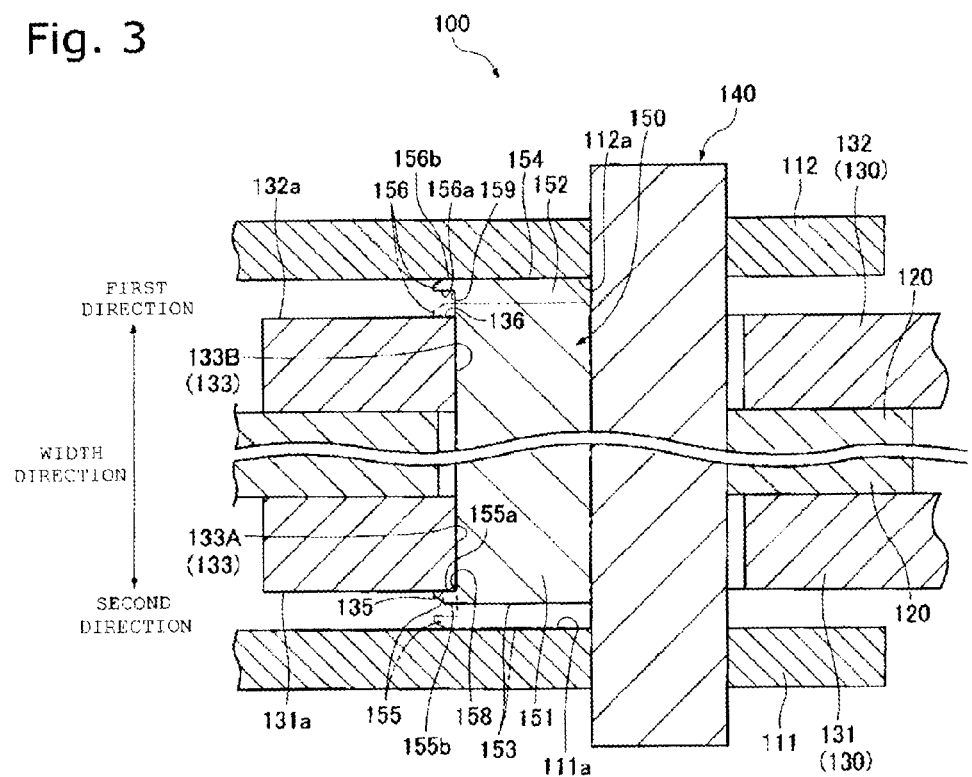
FIG. 3 is an enlarged view of a principal portion of FIG. 2.

FIGS. 1 to 3 are views for explaining a first embodiment.

Referring to FIG. 1, in the first embodiment, a silent chain 100 (hereinafter referred to as a "chain 100") is an endless chain, and is provided in a chain drive system. The chain drive system is used in power equipment mounted on an automobile.

In addition to the chain 100, the chain drive system includes a sprocket system including a plurality of sprockets around which the chain 100 is wound. At least one of the plurality of sprockets is a driving sprocket rotationally driven by an engine of the power equipment as a chain driving device.

Referring to FIGS. 1 and 2, the chain 100 includes a plurality of guide rows 101, a plurality of non-guide rows 103, and a plurality of rocker pins 104. The guide row 101 and the non-guide row 103 adjacent to each other in a longitudinal direction are coupled by the rocker pin 104 so as to be bendable, and are alternately disposed in the longitudinal direction.

Each guide row 101 includes first and second guide plates 111 and 112 as a pair of guide plates, and at least one first plate 120, in the present embodiment, a plurality of the first plates 120 disposed between the guide plates 111 and 112 in a width direction. Each of the guide plates 111 and 112 is provided with a pair of guide pin holes 113 that are spaced apart in a longitudinal direction. In addition, each first plate 120 is provided with a pair of first pin holes 123 that are spaced apart in the longitudinal direction, and a pair of teeth 124 that can mesh with the sprocket.

Each non-guide row 103 includes a plurality of second plates 130 disposed between the guide plates 111 and 112 in the width direction. Each second plate 130 is provided with a pair of second pin holes 133 that are spaced apart in the longitudinal direction, and a pair of teeth 134 that can mesh with the sprocket. Each second plate 130 extends over a pair of the guide rows 101 adjacent to each other on both sides in the longitudinal direction, and the second plate 130 and the first plate 120 are alternately disposed in the width direction.

Each of the teeth 124 and 134 is a mesh portion with the sprocket in the chain 100.

The rocker pin 104 includes a long pin 140 and a short pin 150 having a widthwise length shorter than that of the long pin 140. The long pin 140 is inserted into the first pin holes 123 and the second pin holes 133 so as to be movable in the width direction with respect to the plates 120 and 130, and is inserted into and held in the guide pin holes 113 at both end portions thereof 141 and 142 in a state where the long pin 140 is prevented from rotating relative to or slipping out from (e.g., press-fitted in) the guide plates 111 and 112.

The short pin 150 is inserted only into the first pin holes 123 and the second pin holes 133 so as to be movable in the width direction with respect to the first and second plates 120 and 130. As shown in FIG. 1, an outer peripheral surface 157 (see also FIG. 2) of the short pin 150 has a back surface 157a seated on a hole wall surface 133w of the second pin hole 133, a rolling surface 157b rollable while being in contact with a rolling surface 147b of an outer peripheral surface 147 of the long pin 140, and a pair of sliding surfaces 157c in sliding contact with a hole wall surface 132w (see FIG. 2) of the first pin hole 123 when the short pin 150 rolls.

The long pin 140 and the short pin 150 of each rocker pin 104 always extend through all of the first plates 120 of each guide row 101 and all of the second plates 130 of each non-guide row 103 in the width direction in a state where the long pin 140 and the short pin 150 couple the guide row 101 and the non-guide row 103.

Referring to FIGS. 1 and 2 appropriately while referring mainly to FIG. 3, first and second adjacent plates 131 and 132 as a pair of the second plates 130 adjacent to the first and second guide plates 111 and 112 in the width direction are provided with first and second contact portions 135 and 136 respectively. The first and second contact portions 135 and 136 are parts of side surfaces 131a and 132a of the first and second adjacent plates 131 and 132 that oppose side surfaces 111a and 112a of the first and second guide plates 111 and 112 in the width direction, and are opening edge portions that surround first and second adjacent pin holes 133A and 133B as the second pin holes 133.

The short pin 150 has first and second end portions 151 and 152 as both end portions in the width direction. The first and second end portions 151 and 152 have first and second end surfaces 153 and 154 respectively as both end surfaces of the short pin 150.

In the first and second end portions 151 and 152, first and second stoppers 155 and 156 constituted by portions as plastic deformation portions formed by plastically deforming (e.g., swaging) the first and second end portions 151 and 152 are provided integrally with the short pin 150 by, e.g., integral molding with the short pin 150. The first stopper 155 is capable of coming into contact with the first contact portion 135 toward a first direction when the short pin 150 moves in the first direction in the width direction relative to the first adjacent plate 131. The second stopper 156 is capable of coming into contact with the second contact portion 136 toward a second direction when the short pin 150 moves in the second direction opposite to the first direction relative to the second adjacent plate 132.

The first and second stoppers 155 and 156 protrude from the outer peripheral surface 157 in a direction orthogonal to the width direction in parts of portions 158 and 159 (see FIGS. 1 and 2) ranging with the first and second end surfaces 153 and 154 of the outer peripheral surface 157 of the short pin 150. More specifically, each of the first and second stoppers 155 and 156 is a protruding portion that protrudes from the back surface 157a outwardly of the second pin hole 133 in a radial direction and the longitudinal direction at the same circumferential position as the back surface 157a.

Accordingly, the first and second stoppers 155 and 156 come into contact with the first and second adjacent plates 131 and 132 to thereby suppress tilting of the adjacent plates 131 and 132 in the width direction with respect to the plane orthogonal to the width direction, and hence contacts between the plates 111 and 131, between the plates 112 and 132, and between the plates 120 and 130 caused by the tilting of the adjacent plates 131 and 132 are suppressed, and it is possible to reduce the wear and frictional resistance caused by the contacts in each of the plates 111, 112, 120, and 130.

Note that the circumferential direction and the radial direction are the circumferential direction and the radial direction with a straight line in parallel with the width direction and extending through the pin holes 123 and 133 used as the center (e.g., a straight line passing through the center of curvature of an arc-like portion of the second pin hole 133).

When the rocker pin 104 is inserted into all of the first and second pin holes 123 and 133, first, the short pin 150 is inserted into the first and second pin holes 123 and 133 of all of the first and second plates 120 and 130 stacked on each other in the width direction, the first and second stoppers 155 and 156 are held so as to extend through the first and second adjacent pin holes 133A and 133B, and then the long pin 140 is inserted.

The first and second stoppers 155 and 156 have first and second contact surfaces 155a and 156a that oppose the first and second adjacent plates 131 and 132 in the width direction and are capable of coming into contact with the first and second contact portions 135 and 136, and first and second opposing surfaces 155b and 156b that oppose and are capable of coming into contact with the first and second guide plates 111 and 112 in the width direction.

The first and second contact surfaces 155a and 156a are positioned closer to the first and second adjacent plates 131 and 132 than the first and second end surfaces 153 and 154 in the width direction. The first and second opposing surfaces 155b and 156b are disposed at the same positions as the first and second end surfaces 153 and 154 in the width direction, and are on the same planes as the first and second end surfaces 153 and 154.

As indicated by the solid line in FIG. 3, when a first contact state in which the first stopper 155 and the first contact portion 135 are in contact with each other in the width direction is established, the entire first end surface 153 protrudes in the second direction from the side surface 131a in which the first adjacent pin hole 133A is opened, and the entire second end surface 154 protrudes in the first direction from the side surface 132a in which the second adjacent pin hole 133B is opened. Accordingly, the first end surface 153 is prevented from being positioned in the first adjacent pin hole 133A when the short pin 150 moves in the first direction relative to the first adjacent plate 131.

Similarly, as indicated by the two-dot chain line in FIG. 3, when a second contact state in which the second stopper 156 and the second contact portion 136 are in contact with each other in the width direction is established, the entire second end surface 154 protrudes in the first direction from the side surface 132a, and the entire first end surface 153 protrudes in the second direction from the side surface 131a. Accordingly, the second end surface 154 is prevented from being positioned in the second adjacent pin hole 133B when the short pin 150 moves in the second direction relative to the second adjacent plate 132.

In addition, in the first contact state (or the second contact state), a widthwise gap is formed between the contact surface 156a of the second stopper 156 (the contact surface 155a of the first stopper 155) and the side surface 132a of the second adjacent plate 132 (the side surface 131a of the first adjacent plate 131), and hence the second stopper 156 (the first stopper 155) is not in contact with the second contact portion 136 (the first contact portion 135) and is spaced apart from the second contact portion 136 (the first contact portion 135) in the width direction, while the second stopper 156 (the first stopper 155) is in contact with the side surface 112a of the second guide plate 112 (the first side surface 111a of the first guide plate 11) on the second opposing surface 156b (the first opposing surface 155b).

Thus, in each of a first non-contact state in which the first stopper 155 and the first contact portion 135 are not in contact with each other and a second non-contact state in which the second stopper 156 and the second contact portion 136 are not in contact with each other, the both end surfaces 153 and 154 of the short pin 150 protrude in the width direction toward the first and second guide plates 111 and 112 from the first and second adjacent pin holes 133A and 133B.

Further, the length of the short pin 150 is set so as to allow formation of a widthwise gap between the first end surface 153 of the short pin 150 and the side surface 131a of the first adjacent plate 131, and the side surface 111a of the first guide plate 111 when the second stopper 156 is in contact with the second guide plate 112 toward the first direction in the first contact state, and is set so as to allow formation of a widthwise gap between the second end surface 154 of the short pin 150 and the side surface 132a of the second adjacent plate 132, and the side surface 112a of the second guide plate 112 when the first stopper 155 is in contact with the first guide plate 111 toward the second direction in the second contact state.

Further, a widthwise gap is formed between the first adjacent plate 131 and the first guide plate 111 when the first stopper 155 is in contact with the first guide plate 111 in the second contact state, and a widthwise gap is formed between the second adjacent plate 132 and the second guide plate 112 when the second stopper 156 is in contact with the second guide plate 112 in the first contact state.

Next, the functions and effects of the embodiment thus constituted will be described.

In the chain 100, the long pin 140 and the short pin 150 constituting the rocker pin 104 that couples the guide row 101 and the non-guide row 103 adjacent to each other in the longitudinal direction such that the guide row 101 and the non-guide row 103 are bendable extend through all of the first plates 120 of each guide row 101 and all of the second plates 130 of each non-guide row 103 in the width direction.

With this, the short pin 150 of each rocker pin 104 supports the first and second adjacent plates 131 and 132 as a pair of the second plates adjacent to a pair of the guide plates 111 and 112 in the width direction in a state where the short pin 150 extends through the second pin holes 133 in each non-guide row 103. As a result, it is possible to prevent the occurrence of excessive stress concentration in the first and second end portions 151 and 152 of the short pin 150 when tension occurs in the chain 100, and hence it is possible to improve the durability of the short pin 150, and increase a proof load applied to the chain 100 after its assembly to increase a residual compressive stress in the first and second plates 120 and 130 so that it is possible to reduce the elastic elongation of the chain 100 to improve the effect of preventing jumping.

The first and second adjacent plates 131 and 132 are provided with the first and second contact portions 135 and 136 respectively, the short pin 150 is provided with the first stopper 155 capable of coming into contact with the first contact portion 135 in the first direction and the second stopper 156 capable of coming into contact with the second contact portion 136 in the second direction, the first end surface 153 is prevented from being positioned in the first adjacent pin hole 133A of the first adjacent plate 131 by the contact between the first stopper 155 and the first contact portion 135, and the second end surface 154 is prevented from being positioned in the second adjacent pin hole 133B of the second adjacent plate 132 by the contact between the second stopper 156 and the second contact portion 136.

With this, in the present embodiment, the short pin 150 can be set so as to always extend through the first and second adjacent pin holes 133A and 133B such that the first and second end surfaces 153 and 154 are not positioned in the first and second adjacent pin holes 133A and 133B of the first and second adjacent plates 131 and 132 by bringing the first and second stoppers 155 and 156 of the short pin 150 into contact with the first and second contact portions 135 and 136 of the first and second adjacent plates 131 and 132 irrespective of the length of the short pin 150 itself. As a result, the length of the short pin 150 can be reduced within a range that allows the provision of the first and second stoppers 155 and 156, and hence the chain 100 can be reduced in weight and widthwise size by reducing the length of the short pin 150.

The length of the short pin 150 is set so as to allow the formation of the widthwise gap between the short pin 150, the first adjacent plate 131, and the first guide plate 111 when the second stopper 156 is in contact with the side surface 112a of the second guide plate 112 in the width direction in the first contact state, and is set so as to allow the formation of the widthwise gap between the short pin 150, the second adjacent plate 132, and the second guide plate 112 when the first stopper 155 is in contact with the side surface 111a of the first guide plate 111 in the width direction in the second contact state.

With this, when the second stopper 156 is in contact with the second guide plate 112 in the first contact state, or when the first stopper 155 is in contact with the first guide plate 111 in the second contact state, the widthwise gap is formed between the short pin 150 and the first guide plate 111 or between the short pin 150 and the second guide plate 112, the short pin 150 is reduced in widthwise length correspondingly to the formation of the widthwise gap, and the short pin 150 is reduced in weight by the reduction in the length of the short pin 150, and hence the chain 100 can be reduced in widthwise size and weight.

Further, when the second stopper 156 is in contact with the second guide plate 112 in the first contact state, and when the first stopper 155 is in contact with the first guide plate 111, the widthwise gap is formed between the first adjacent plate 131 and the first guide plate 111. In addition, when the first stopper 155 is in contact with the first guide plate 111 in the second contact state, and when the second stopper 156 is in contact with the second guide plate 112, the widthwise gap is formed between the second adjacent plate 132 and the second guide plate 112. As a result, the contact between the first guide plate 111 and the first adjacent plate 131 and the contact between the second guide plate 112 and the second adjacent plate 132 are suppressed by the first and second stoppers 155 and 156, and it is possible to reduce the wear and the frictional resistance caused by the contacts in each of the first and second guide plates 111 and 112 and the first and second adjacent plates 131 and 132.

Furthermore, the movement amount of the short pin 150 in the width direction is restricted by the first and second stoppers 155 and 156 capable of coming into contact with the first and second guide plates 111 and 112, and hence, even in a case where the first adjacent plate 131 (the second adjacent plate 132) moves in the second direction (the first direction) to come into contact with the first stopper 155 (the second stopper 156) when the first stopper 155 and the first guide plate 111 are in contact with each other (or when the second stopper 156 and the second guide plate 112 are in contact with each other), the first stopper 155 (the second stopper 156) as the protruding portion protruding from the outer peripheral surface 157 of the short pin 150 is supported by the first guide plate 111 (the second guide plate 112) in contact therewith so that it is possible to prevent damage (e.g., bending) to the first stopper 155 (the second stopper 156) without enhancing the rigidity of each of the first and second stoppers 155 and 156 (e.g., without increasing the weight of the first and second stoppers 155 and 156 by increasing the sizes thereof in order to enhance the rigidity thereof).

In addition, it is not necessary to enhance the rigidity of each of the first and second stoppers 155 and 156 so that it is possible to reduce the weight of the short pin 150 provided with the first and second stoppers 155 and 156 correspondingly.

Next, with reference to FIGS. 4 to 8, second to fourth embodiments of the present invention will be described. The shape of each of the first and second guide plates 111 and 112 of the second embodiment is partially different from that of the first embodiment in, the shapes of first and second stoppers 355 and 356 and first and second stoppers 455 and 456 of the third and fourth embodiments corresponding to the first and second stoppers 155 and 156 are partially different from those of the first embodiment, and the configuration of each of the second to fourth embodiments is otherwise the same as that of the first embodiment basically. Accordingly, the description of the portion that is the same as that in the first embodiment is omitted or simplified, and the point different from the first embodiment will be mainly described. Note that members and portions including the first and second guide plates 111 and 112 or the first and second stoppers 355 and 356, and 455 and 456 that are the same as or correspond to those in the first embodiment are basically designated by the same reference numerals as those in the first embodiment.

Figure 4:
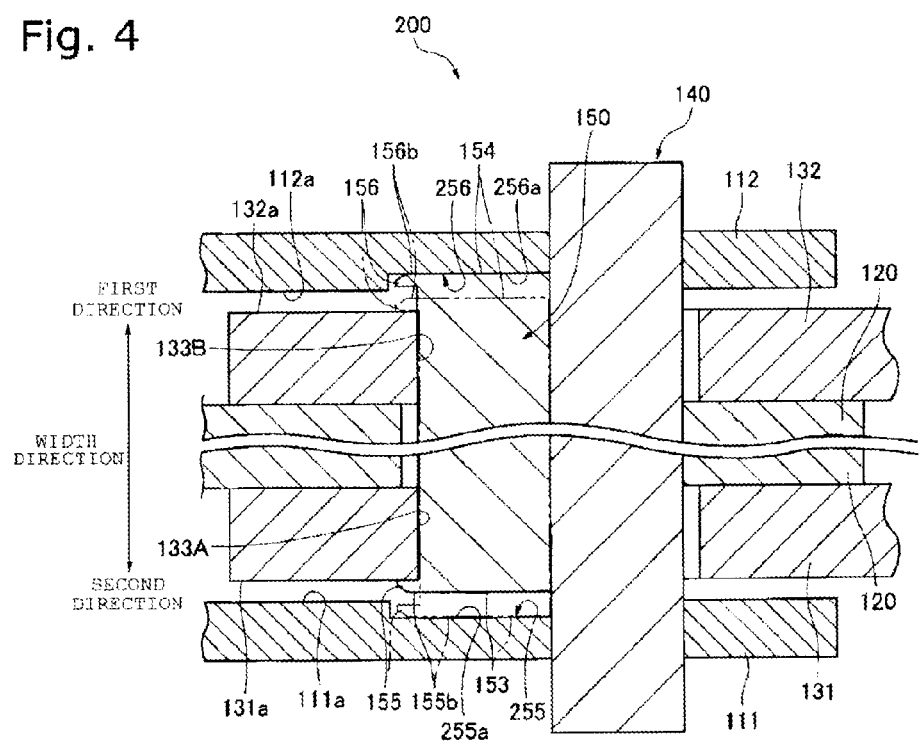
FIG. 4 shows a second embodiment of the present invention, and is a view corresponding to FIG. 3.

Referring to FIG. 4, the first and second guide plates 111 and 112 of a silent chain 200 (hereinafter referred to as a "chain 200") in the second embodiment have first and second concave portions 255 and 256 capable of accommodating the first and second stoppers 155 and 156.

In the first contact state (the second contact state), the entire second stopper 156 (the entire first stopper 155) is accommodated in the second concave portion 256 (the first concave portion 255) together with the portion 159 (the portion 158) corresponding to the widthwise formation range of the second stopper 156 (the first stopper 155) in the second end portion 152 (the first end portion 151) in a state where the second opposing surface 156b (the first opposing surface 155b) and the second end surface 154 (the first end surface 153) are in contact with a bottom surface 256a of the second concave portion 256 (a bottom surface 255a of the first concave portion 255).

Further, the widthwise depths of the first and second concave portions 255 and 256 are larger than the widthwise thicknesses of the first and second stoppers 155 and 156, and hence, in the first contact state (the second contact state), even when the stopper 156 (the stopper 155) is not in contact with the second guide plate 112 (the first guide plate 111) in the width direction, the entire stopper 156 (the entire stopper 155) is positioned in the second concave portion 256 (the first concave portion 255).

According to the second embodiment, in addition to the functions and effects achieved by the configuration shared by or corresponding to the first embodiment, the following functions and effects can be achieved.

The first guide plate 111 is provided with the first concave portion 255 capable of accommodating the entire first stopper 155, and the second guide plate 112 is provided with the second concave portion 256 capable of accommodating the entire second stopper 156.

With this, since the first and second stoppers 155 and 156 are accommodated in the first and second concave portions 255 and 256, the widthwise size of the chain 200 is reduced. In addition, in the state where the first and second stoppers 155 and 156 are accommodated in the first and second concave portions 255 and 256, the end surfaces 153 and 154 of the short pin 150 are positioned inside the first and second guide plates 111 and 112, and hence it is possible to reduce a shearing force generated in the long pin 140 by the short pin 150 biased by the tension occurring in the chain 200 to thereby improve the durability of the long pin 140.

Further, since the entire stoppers 155 and 156 are accommodated in the concave portions 255 and 256, the chain 200 can be further reduced in widthwise size. Furthermore, when the entire first stopper 155 is positioned in the first concave portion 255 (or when the entire second stopper 156 is positioned in the second concave portion 256), even in a case where the first adjacent plate 131 (the second adjacent plate 132) moves in the second direction (the first direction) with respect to the short pin 150, the side surface 131a of the first adjacent plate 131 (the side surface 132a of the second adjacent plate 132) comes into contact with the side surface 111a of the first guide plate 111 (the side surface 112a of the second guide plate 112), and the contact between the first adjacent plate 131 (the second adjacent plate 132) and the first stopper 155 (the second stopper 156) is thereby avoided. As a result, it is possible to prevent damage to the first and second stoppers 155 and 156 without enhancing the rigidity of each of the first and second stoppers 155 and 156.

Figure 5:
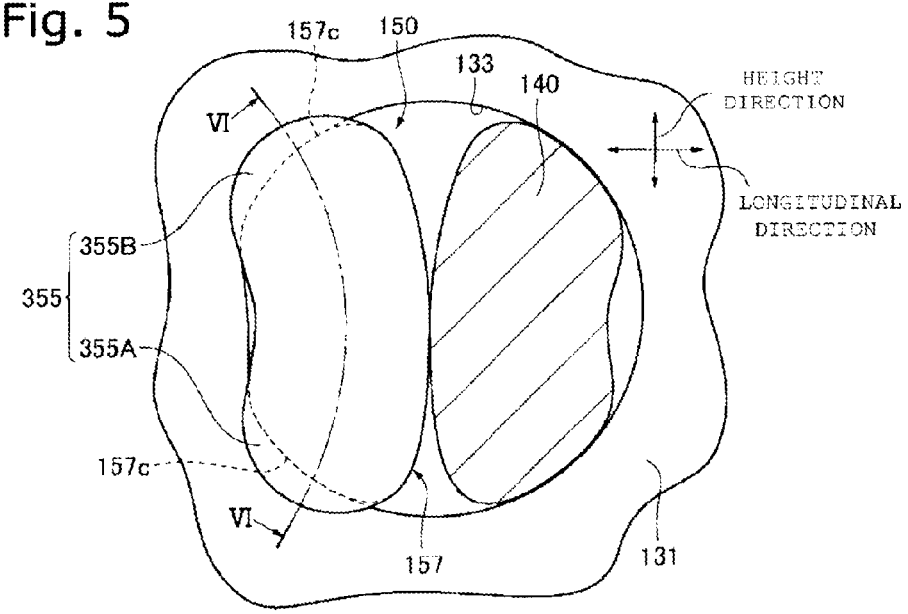
FIG. 5 shows a third embodiment of the present invention, and is a view corresponding to a cross-sectional view in the vicinity of a pin hole in FIG. 3.
Figure 6:
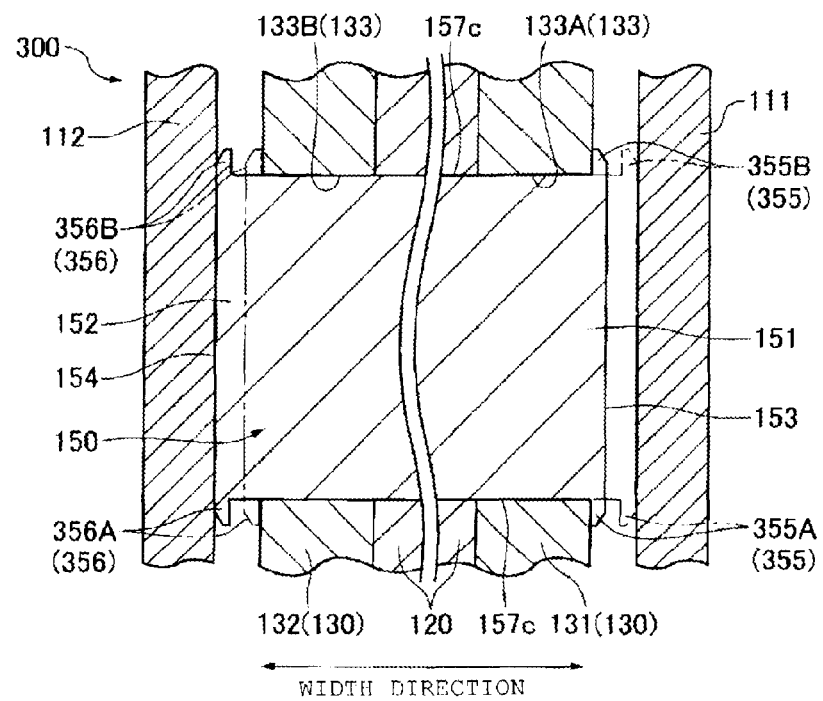
FIG. 6 is a cross-sectional view taken along line VI-VI of FIG. 5.

Referring to FIGS. 5 and 6, in a silent chain 300 (hereinafter referred to as a "chain 300") in the third embodiment, first and second stoppers 355 and 356 are constituted by a plurality of protruding portions that are provided so as to protrude outwardly of the second pin hole 133 from the individual sliding surfaces 157c in the radial direction at the same circumferential positions as the pair of the sliding surfaces 157c of the outer surface 157 at positions spaced apart in the circumferential and height directions in the both end portions 151 and 152 of the short pin 150, a pair of the protruding portions in the present embodiment, i.e., first stopper portions 355A and 355B, and second stopper portions 356A and 356B. Similarly to the first and second stoppers 155 and 156 in the first embodiment, each of the stopper portions 355A, 355B, 356A, and 356B is a swaged portion.

According to the third embodiment, the first and second stoppers 355 and 356 perform the same functions as those of the first and second stoppers 155 and 156 of the first embodiment, and the following functions and effects can thereby be achieved in addition to the functions and effects achieved by the first embodiment.

In the chain 300, the stoppers 355 and 356 have the pair of the stopper portions 355A and 355B and the pair of the stopper portions 356A and 356B that are spaced apart in the height direction, whereby the first and second stoppers 355 and 356 come into contact with the first and second adjacent plates 131 and 132 at two locations spaced apart in the height direction, and hence the effect of suppressing tilting of the adjacent plates 131 and 132 in the width direction with respect to the plane orthogonal to the width direction, in particular, the tilting thereof about a straight line in parallel with the longitudinal direction is improved as compared with the first embodiment. As a result, the contacts between the plates 111 and 131, between the plates 112 and 132, and between the plates 120 and 130 caused by the tilting of the adjacent plates 131 and 132 are suppressed, and it is possible to reduce the wear and the frictional resistance caused by the contacts in each of the plates 111, 112, 120, and 130.

Figure 7:
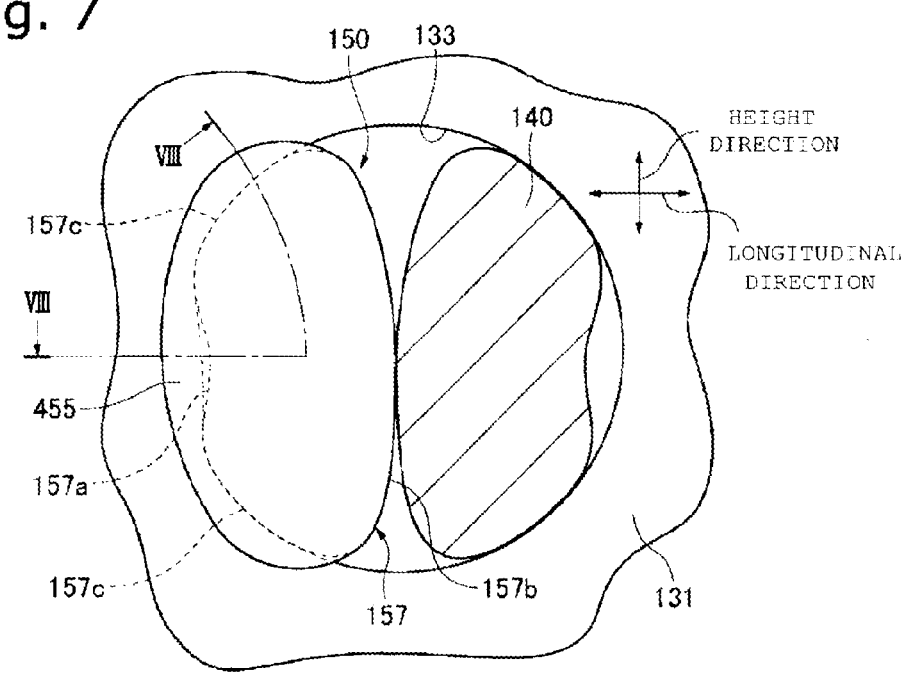
FIG. 7 shows a fourth embodiment of the present invention, and is a view corresponding to the cross-sectional view in the vicinity of the pin hole in FIG. 3.
Figure 8:
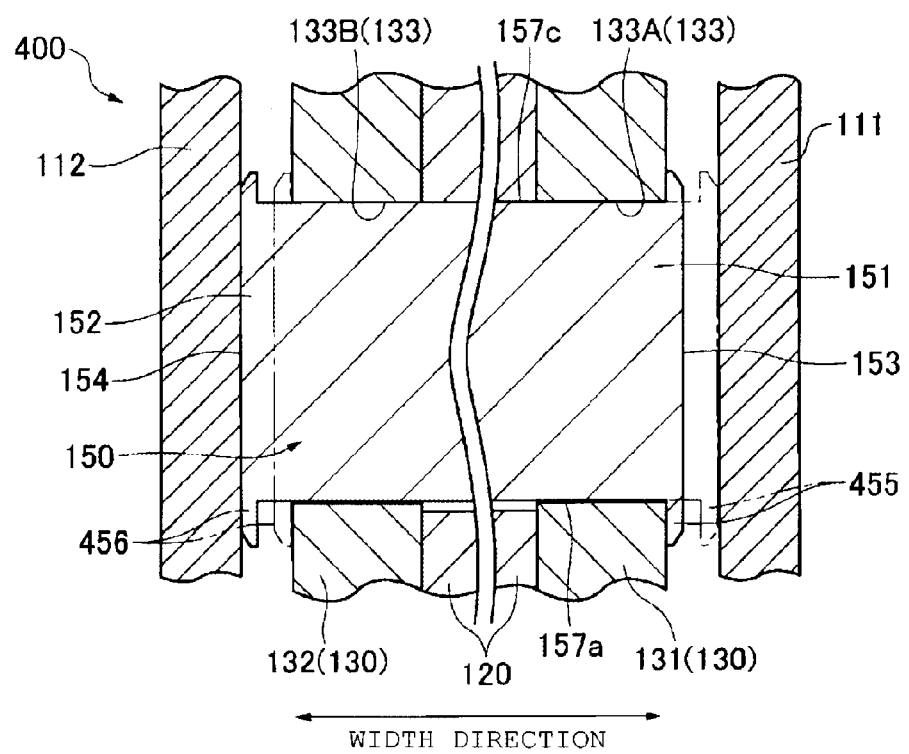
FIG. 8 is a cross-sectional view taken along line VIII-VIII of FIG. 7.

Referring to FIGS. 7 and 8, in a silent chain 400 (hereinafter referred to as a "chain 400") in the fourth embodiment, first and second stoppers 455 and 456 are constituted by partially annular protruding portions that are provided so as to protrude outwardly of the second pin hole 133 from the sliding surfaces 157c and the back surface 157a in the radial direction continuously over the range of both of the sliding surfaces 157c and the back surface 157a in the circumferential direction at the same circumferential positions as the pair of the sliding surfaces 157c and the back surface 157a except the same circumferential position as the rolling surface 157b of the outer surface 157 in the both end portions 151 and 152 of the short pin 150.

Similarly to the first and second stoppers 155 and 156 of the first embodiment, the stoppers 455 and 456 are swaged portions, and are formed in the range of the height direction equal to or larger than the maximum hole diameter of the second pin hole 133 in the height direction.

According to the fourth embodiment, the first and second stoppers 455 and 456 perform the same functions as those of the first and second stoppers 155 and 156 of the first embodiment, and the following functions and effects are thereby achieved in addition to the functions and effects achieved by the first embodiment.

In the chain 400, the stoppers 455 and 456 are formed in the range of the pair of the sliding surfaces 157c and the back surface 157a, whereby the first and second stoppers 455 and 456 come into contact with the first and second adjacent plates 131 and 132 in the range of the pair of the sliding surfaces 157c and the back surface 157a in the height direction and the longitudinal direction, and hence the effect of suppressing tilting of the adjacent plates 131 and 132 in the width direction with respect to the plane orthogonal to the width direction, in particular, tilting thereof about the straight line in parallel with the longitudinal direction and tilting thereof about a straight line in parallel with the height direction is improved as compared with the first embodiment. As a result, the contacts between the plates 111 and 131, between the plates 112 and 132, and between the plates 120 and 130 caused by the tilting of the adjacent plates 131 and 132 are suppressed, and it is possible to reduce the wear and the frictional resistance caused by the contacts in each of the plates 111, 112, 120, and 130.

Hereinbelow, with regard to embodiments obtained by partially changing the configuration of each of the embodiments described above, the changed configuration will be described.

The concave portion in which the first stopper (the second stopper) is accommodated may be provided in the side surface 131a of the first adjacent plate 131 (the side surface 132a of the second adjacent plate 132) in the first contact state (the second contact state), and the end surface 153 (the end surface 154) may be positioned on the same plane as the side surface 131a (the side surface 132a) in the first contact state (the second contact state). In this case, in the first contact state (the second contact state), the end surface 153 (the end surface 154) does not protrude beyond the side surface 131a (the side surface 132a) in the width direction, and hence it is possible to reduce the length of the short pin 150 correspondingly.

The opposing surfaces 155b and 156b may be positioned closer to the adjacent plates 131 and 132 than the end surfaces 153 and 154.

In the first contact state (or the second contact state), the widthwise gap may be formed between the second end surface 154 (the first end surface 153) of the short pin 150, the second stopper 156 (the first stopper 155), and the side surface 112a (the side surface 111a).

The length of the short pin 150 may be set so as to simultaneously allow the contact between at least one of the first end surface 153 and the first stopper 155 and the side surface 111a and the contact between at least one of the second end surface 154 and the second stopper 156 and the side surface 112a.

At least one of the first and second stoppers 155 and 156, 355 and 356, or 455 and 456 may be formed by a formation method other than swaging, or may be constituted by a member other than the short pin 150 and coupled to the short pin 150.

In the second embodiment, a part of the first and second stoppers 155 and 156 may be accommodated in the first and second concave portions 255 and 256 in the width direction together with a part of the end portions 151 and 152.

In each of the third and fourth embodiments, similarly to the first and second stoppers 155 and 156 in the second embodiment and its variation, the entire first stopper 355 or 455 or apart thereof may be accommodated in the concave portion provided in the first guide plate 111, and the entire second stopper 356 or 456 or a part thereof may be accommodated in the concave portion provided in the second guide plate 112. In this case, as the size of each of the first and second stoppers 355 and 356 and 455 and 456 is larger, the size of the concave portion is larger, and hence it is possible to reduce the weight of each of the guide plates 111 and 112.

What is claimed is:

1. A silent chain comprising:
   a plurality of guide rows;
   a plurality of non-guide rows; and
   a plurality of rocker pins that couple each of the guide rows and each of the non-guide rows adjacent to each other in a longitudinal direction such that the guide row and the non-guide row are bendable,
   the guide row being formed of a pair of guide plates and one or more first plates disposed between the pair of guide plates in a width direction,
   the non-guide row being formed of a plurality of second plates disposed between the pair of guide plates in the width direction,
   each of the plurality of rocker pins being formed of a long pin that is inserted into a guide pin hole of each of the guide plates, a first pin hole of each of the first plates, and a second pin hole of each of the second plates, and a short pin that is inserted into the first pin hole and the second pin hole and is shorter than the long pin,
   the long pin and the short pin extending through all of the first plates of each guide row and all of the second plates of each non-guide row in the width direction,
   first and second adjacent plates as a pair of the second plates adjacent to first and second guide plates as the pair of guide plates in the width direction being provided with first and second contact portions respectively,
   the short pin being provided with a first stopper capable of coming into contact with the first contact portion toward a first direction in the width direction, and a second stopper capable of coming into contact with the second contact portion toward a second direction opposite to the first direction,
   a first end surface of the short pin being prevented from being positioned in the second pin hole of the first adjacent plate by contact between the first stopper and the first contact portion, and
   a second end surface of the short pin being prevented from being positioned in the second pin hole of the second adjacent plate by contact between the second stopper and the second contact portion.

2. The silent chain according to claim 1 wherein
a length of the short pin is shorter than a widthwise space between the first guide plate and the second guide plate, and
a widthwise space between the first stopper and the second stopper of the short pin is set to be larger than the sum of thicknesses of the first plate and the second plate through which the short pin extends.

3. The silent chain according to claim 1 wherein
the first guide plate is provided with a first concave portion capable of accommodating the entire first end surface of the short pin including the first stopper, and
the second guide plate is provided with a second concave portion capable of accommodating the entire second end surface of the short pin including the second stopper.

4. The silent chain according to claim 2 wherein
the first guide plate is provided with a first concave portion capable of accommodating the entire first end surface of the short pin including the first stopper, and
the second guide plate is provided with a second concave portion capable of accommodating the entire second end surface of the short pin including the second stopper.

* * * * *